US012783189B2

(12) United States Patent
Nakayama

(10) Patent No.: US 12,783,189 B2
(45) Date of Patent: Nov. 3, 2026

(54) NON-TRANSITORY COMPUTER READABLE MEDIUM, MANAGEMENT SYSTEM, AND PRINTING SYSTEM

(71) Applicant: FUJIFILM Business Innovation Corp., Tokyo (JP)

(72) Inventor: Yuta Nakayama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/447,847

(22) Filed: Aug. 10, 2023

(65) Prior Publication Data

US 2024/0311062 A1 Sep. 19, 2024

(30) Foreign Application Priority Data

Mar. 14, 2023 (JP) ................................ 2023-039443

(51) Int. Cl.
*G06F 3/12* (2006.01)

(52) U.S. Cl.
CPC .......... *G06F 3/1232* (2013.01); *G06F 3/1204* (2013.01); *G06F 3/1236* (2013.01); *G06F 3/126* (2013.01)

(58) Field of Classification Search
None
See application file for complete search history.

(56) References Cited

U.S. PATENT DOCUMENTS

| | | | | |
|---|---|---|---|---|
| 9,811,298 | B2 | 11/2017 | Oshima | |
| 2016/0274828 | A1 | 9/2016 | Oshima | |
| 2017/0048416 | A1* | 2/2017 | Cho | G06F 3/1292 |
| 2020/0192917 | A1* | 6/2020 | Kawano | G06F 3/1259 |

FOREIGN PATENT DOCUMENTS

| | | | |
|---|---|---|---|
| JP | 6589314 | B2 | 10/2019 |

* cited by examiner

*Primary Examiner* — Frantz Bataille
(74) *Attorney, Agent, or Firm* — Oliff PLC

(57) ABSTRACT

A non-transitory computer readable medium stores a program causing a computer to execute a process including: collecting group information of each of plural printers classified into plural groups from each of the plural printers by connecting to each of the plural printers; and accumulating group information of each of the plural printers in a specific printer among the plural printers as group information of the plural printers together with group information of the specific printer by connecting to the specific printer.

12 Claims, 13 Drawing Sheets

302

301

NON-TRANSITORY COMPUTER READABLE MEDIUM, MANAGEMENT SYSTEM, AND PRINTING SYSTEM

CROSS-REFERENCE TO RELATED APPLICATIONS

This application is based on and claims priority under 35 USC 119 from Japanese Patent Application No. 2023-039443 filed Mar. 14, 2023.

BACKGROUND

(i) Technical Field

The present disclosure relates to a non-transitory computer readable medium, a management system, and a printing system.

(ii) Related Art

Japanese Patent No. 6589314 describes a method for controlling an image forming apparatus that is a method including acquiring cooperation information that defines cooperation of operation between the image forming apparatus and one or more other image forming apparatuses by communicating with the other image forming apparatuses and includes identification information for identifying an image forming apparatus group to which the image forming apparatus belongs, executing processing in accordance with the acquired cooperation information upon receipt of a request from a terminal apparatus, and notifying the terminal apparatus of the identification information upon receipt of an inquiry from the terminal apparatus.

SUMMARY

Plural printers are classified into plural groups in some cases. If to which group each of the plural printers belongs cannot be grasped, convenience during use of the plural printers decreases.

Aspects of non-limiting embodiments of the present disclosure relate to a technique for improving convenience during use of plural printers as compared with a case where to which group each of the plural printers belongs cannot be grasped.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a non-transitory computer readable medium storing a program causing a computer to execute a process including: collecting group information of each of plural printers classified into plural groups from each of the plural printers by connecting to each of the plural printers; and accumulating group information of each of the plural printers in a specific printer among the plural printers as group information of the plural printers together with group information of the specific printer by connecting to the specific printer.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure is described in detail below with reference to the attached drawings.

Outline of Present Exemplary Embodiment

The present exemplary embodiment provides a program causing a computer to collect group information of each of plural printers classified into plural groups from each of the plural printer by connecting to each of the plural printers and accumulate the group information of each of the plural printers in a specific printer among the plural printers as the group information of the plural printers together with group information of the specific printer by connecting to the specific printer. The group information of a printer is identification information for identifying a group into which the printer is classified.

Note only the group information, but also feature information indicative of a feature of the printer may be accumulated in the printer. The feature information includes model information indicative of a model of the printer, state information indicative of a state of the printer, and location information indicative of a location where the printer is installed.

That is, the collecting function of the program may further collect feature information of each of the plural printers from each of the plural printers by connecting to each of the plural printers, and the accumulating function of the program may further accumulate the feature information of each of the plural printers in the specific printer as feature information of the plural printers together with feature information of the specific printer by connecting to the specific printer.

In the following description, an image processing apparatus that performs not only printing, that is, image formation, but also image reading, image transmission, image reception, and the like is described as an example of a printer. A case where not only group information, but also feature information are accumulated in the image processing apparatus is described as an example.

Overall Configuration of Image Processing System

Figure 1:
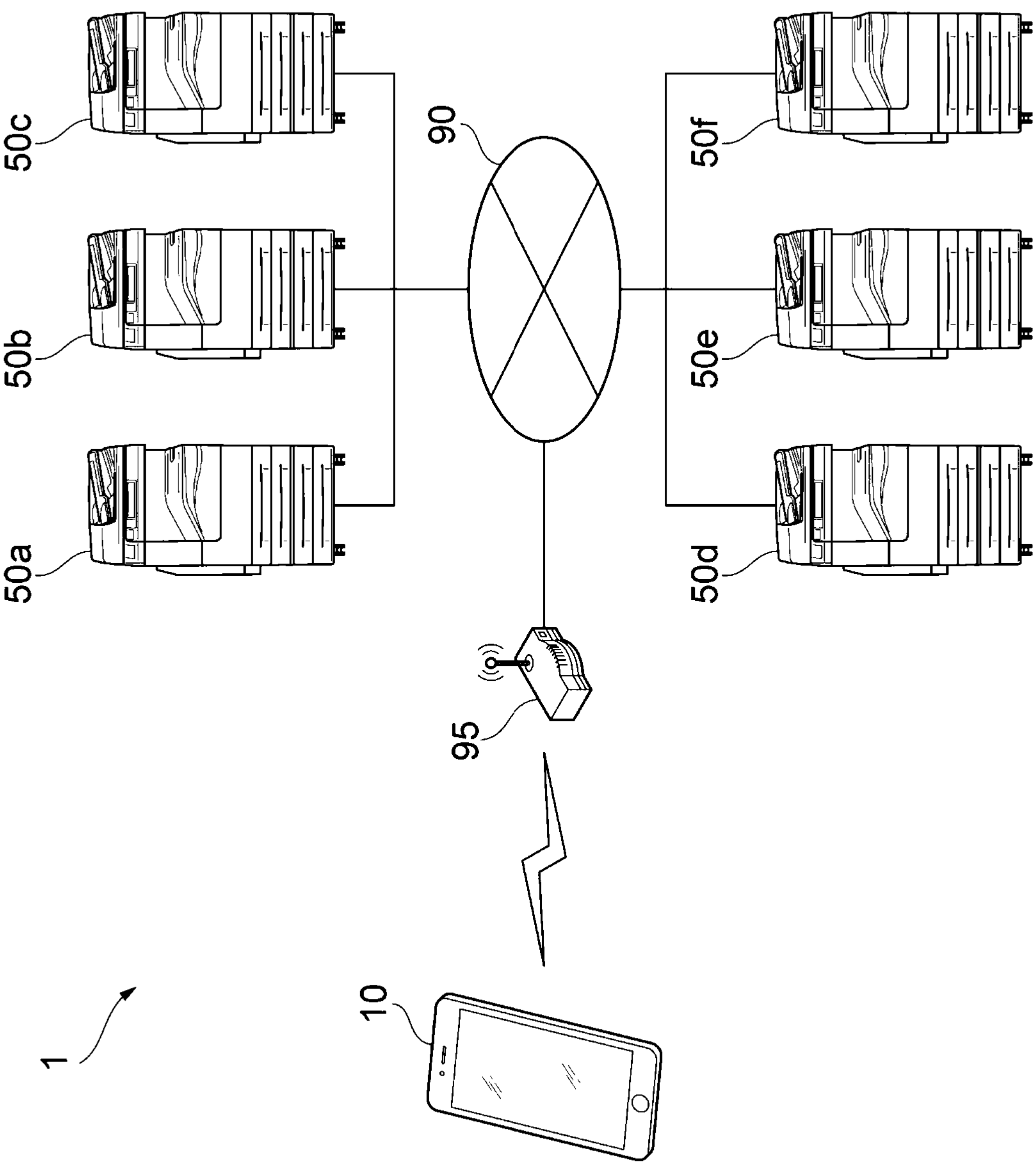
FIG. 1 illustrates an example of an overall configuration of an image processing system according to the present exemplary embodiment.

FIG. 1 illustrates an example of an overall configuration of an image processing system 1 to which the present exemplary embodiment is applied. As illustrated in FIG. 1, the image processing system 1 is an example of a printing system and includes a mobile terminal 10 and image processing apparatuses 50*a* to 50*f*. The mobile terminal 10 is wirelessly connectable to a communication line 90 via an access point 95 by wireless communication such as Wi-Fi (Registered Trademark). Furthermore, the image processing apparatuses 50*a* to 50*f* are connected to the communication line 90.

The mobile terminal 10 is a terminal apparatus used by a user using the image processing system 1. In the mobile terminal 10, applications for collecting information from the image processing apparatuses 50, accumulating the collected information in the image processing apparatuses 50, and displaying the information on the image processing apparatuses 50 have been installed. The mobile terminal 10 can be, for example, a smartphone. Although only a single mobile terminal 10 is illustrated in FIG. 1, plural mobile terminals 10 may be provided.

Each of the image processing apparatuses 50*a* to 50*f* is an example of a printer and is an apparatus that performs image processing such as formation of an image on a recording medium such as paper, reading of an image from a recording medium such as paper, transmission of an image to a public line, and reception of an image from the public line. It is assumed that the image processing apparatuses 50*a* to 50*c* are installed in an office X and the image processing apparatuses 50*d* to 50*f* are installed in an office Y. Although the image processing apparatuses 50*a* to 50*f* are illustrated in FIG. 1, the image processing apparatuses 50*a* to 50*f* are sometimes referred to as image processing apparatuses 50 in a case where they need not be distinguished from one another. Although the number of image processing apparatuses 50 is six in FIG. 1, the number of image processing apparatuses 50 may be one to five or may be seven or more.

The communication line 90 is means of communication used for information communication, for example, between the mobile terminal 10 and the image processing apparatuses 50. The communication line 90 can be, for example, the Internet or a local area network (LAN).

Hardware Configuration of Mobile Terminal

Figure 2:
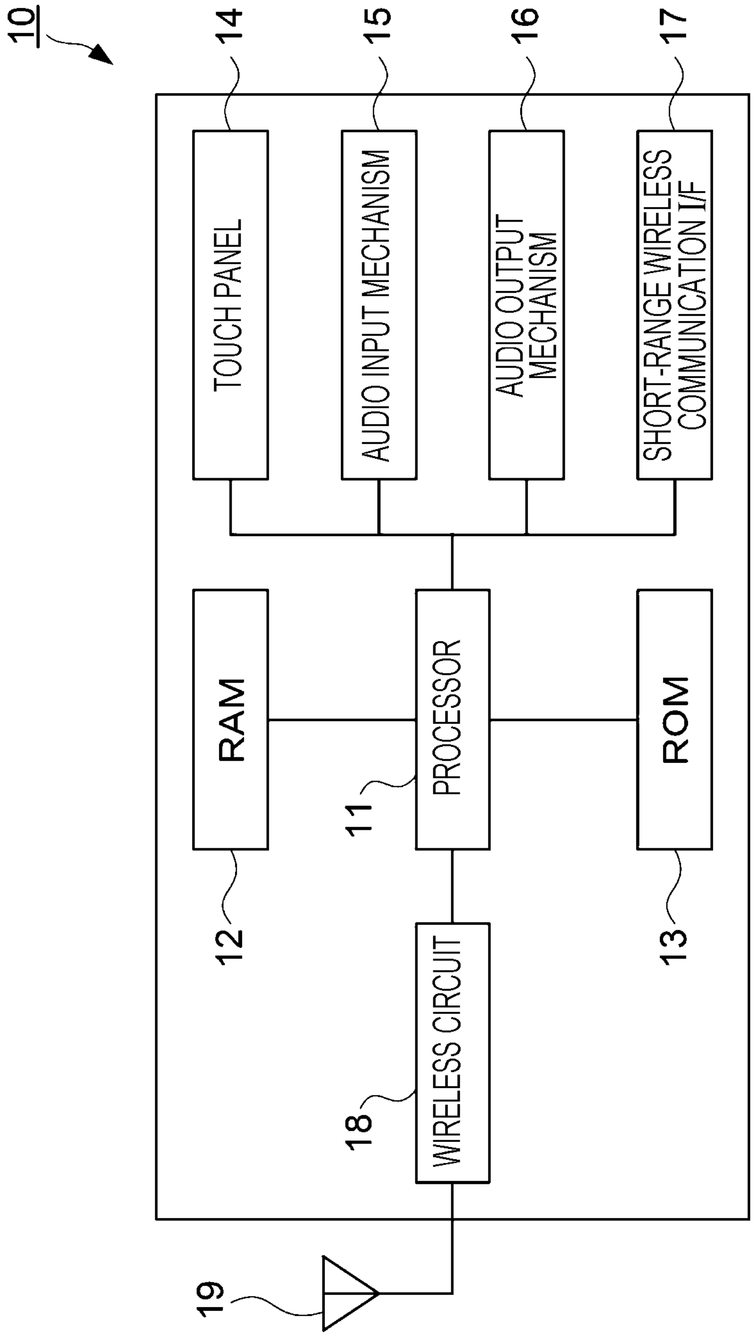
FIG. 2 illustrates an example of a hardware configuration of a mobile terminal according to the present exemplary embodiment.

FIG. 2 illustrates an example of a hardware configuration of the mobile terminal 10 according to the present exemplary embodiment. As illustrated in FIG. 2, the mobile terminal 10 includes a processor 11, which is a computing unit, a RAM 12 and a ROM 13, which are storage units, a touch panel 14 that displays various kinds of information and receives an operation input from a user, an audio input mechanism 15 such as a microphone, an audio output mechanism 16 such as a speaker, and a short-range wireless communication interface (hereinafter referred to as "I/F") 17 that performs transmission and reception of various kinds of information among the image processing apparatuses 50 by short-range wireless communication such as near field communication (NFC). Furthermore, a wireless circuit 18 and an antenna 19 for performing wireless communication via a base station are provided. It is assumed here that the wireless circuit 18 includes a baseband LSI (not illustrated) that performs signal processing of digital data that is wirelessly transmitted and received.

Hardware Configuration of Image Processing Apparatus

Figure 3:
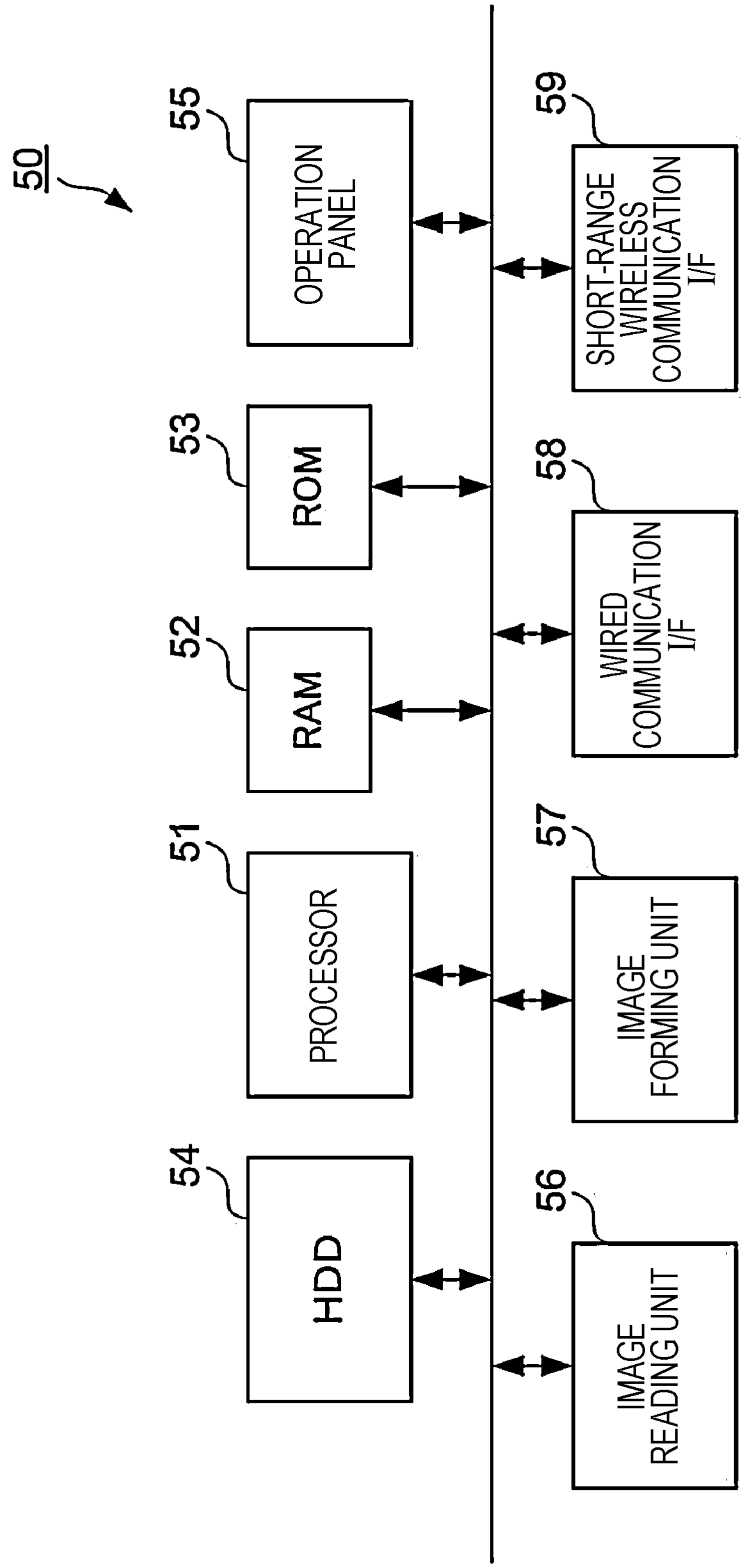
FIG. 3 illustrates an example of a hardware configuration of an image processing apparatus according to the present exemplary embodiment.

FIG. 3 illustrates an example of a hardware configuration of each of the image processing apparatuses 50 according to the present exemplary embodiment. As illustrated in FIG. 3, the image processing apparatus 50 includes a processor 51, a random access memory (RAM) 52, a read only memory (ROM) 53, a hard disk drive (HDD) 54, an operation panel 55, an image reading unit 56, an image forming unit 57, a wired communication I/F 58, and a short-range wireless communication I/F 59.

The processor 51 realizes functions that will be described later by loading various programs stored, for example, in the ROM 53 into the RAM 52 and executing the programs.

The RAM 52 is a memory used as a working memory or the like of the processor 51.

The ROM 53 is a memory in which various programs to be executed by the processor 51 and the like are stored.

The HDD 54 is, for example, a magnetic disk device in which image data read by the image reading unit 56, image data used for image formation in the image forming unit 57, and the like are stored.

The operation panel 55 is, for example, a touch panel that displays various kinds of information and receives an operation input from a user. The operation panel 55 includes a display on which various kinds of information are displayed and a position detection sheet for detecting a position pointed by a pointing unit such as a finger or a stylus pen. Alternatively, a display and a keyboard may be used instead of the touch panel.

The image reading unit 56 reads an image recorded on a recording medium such as paper. The image reading unit 56 is, for example, a scanner and may be a charge coupled device (CCD) type that reduces light emitted from a light source onto a document and reflected by the document by using a lens and receives the light by a charge coupled device or a CIS type that causes a contact image sensor (CIS) to receive light sequentially emitted from an LED light source onto a document and reflected by the document.

The image forming unit 57 forms an image on a recording medium such as paper. The image forming unit 57 is, for example, a printer and may be an electrophotographic system that forms an image by transferring toner attached to a photoreceptor onto a recording medium or an inkjet system that forms an image by ejecting ink onto a recording medium.

The wired communication I/F 58 transmits and receives various kinds of information to and from another apparatus such as the mobile terminal 10 over the communication line 90.

The short-range wireless communication I/F 59 transmits and receives various kinds of information to and from the mobile terminal 10 by short-range wireless communication such as NFC.

Specific Example of Present Exemplary Embodiment

First, classification of the image processing apparatuses 50*a* to 50*f* into plural groups is described as a premise of the present exemplary embodiment.

Figure 4:
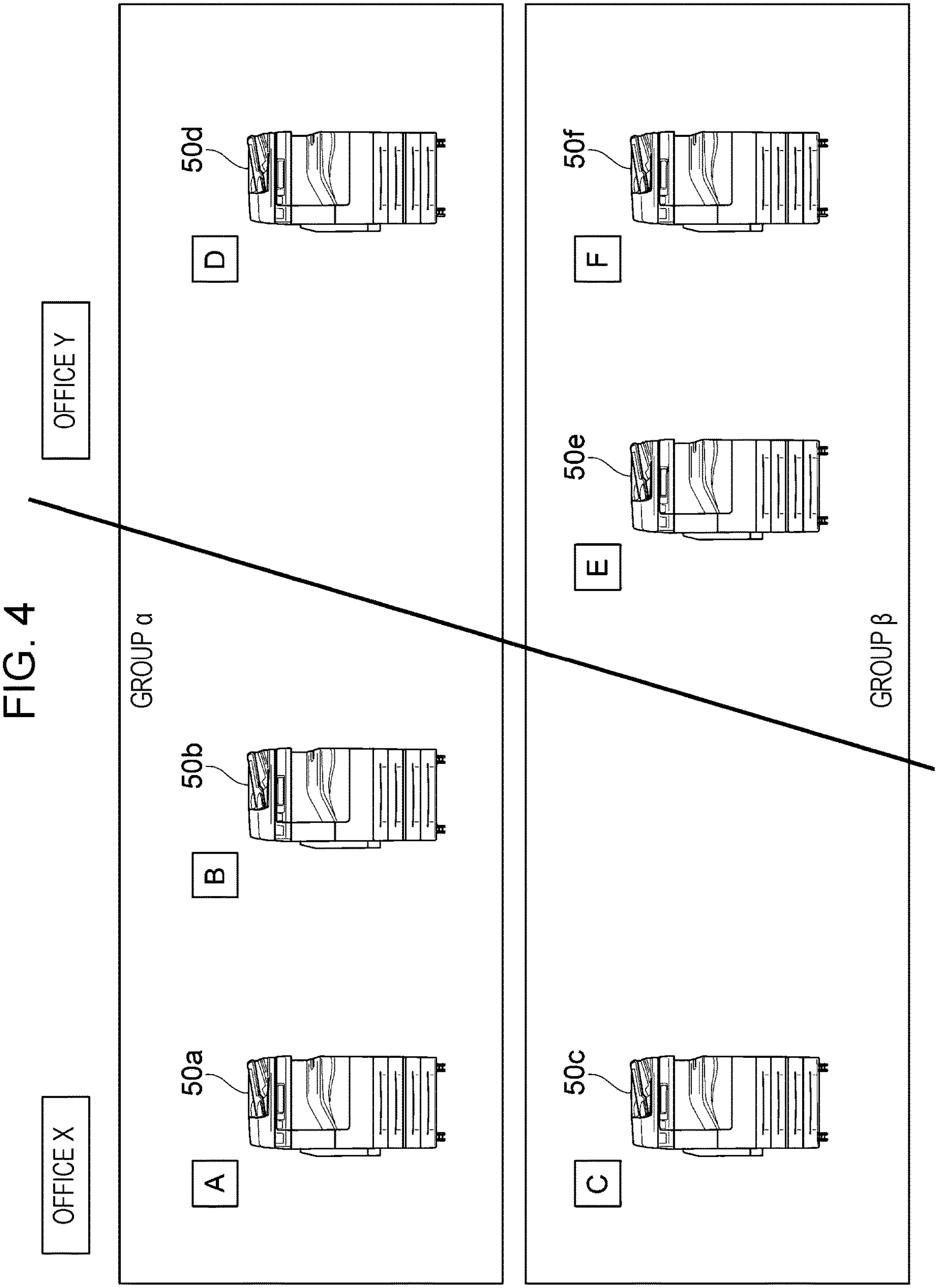
FIG. 4 illustrates an example of classification of plural image processing apparatuses into plural groups.

FIG. 4 illustrates an example of classification into plural groups. Hereinafter, in the drawings, the image processing apparatuses 50*a* to 50*f* are sometimes referred to as image processing apparatuses A to F or simply as A to F. In the present exemplary embodiment, the image processing apparatuses 50*a*, 50*b*, and 50*d* are classified into a group a, and the image processing apparatuses 50*c*, 50*e*, and 50*f* are classified into a group B, as illustrated in FIG. 4.

It is assumed here that plural image processing apparatuses 50 classified into the same group are in a sharing relationship, that is, can share print instruction information for giving a print instruction by directly communicating with each other without a server. For example, in the group a, print instruction information can be transmitted to the image processing apparatus 50*a* and printing based on the print instruction information can be performed by the image processing apparatuses 50*b* and 50*d*. This can be, for example, realized as follows. Specifically, among the plural image processing apparatuses 50 classified into the same group, a parent image processing apparatus 50 communicates with child image processing apparatuses 50 and relays communication between the child image processing apparatuses 50.

In a case where the plural image processing apparatuses 50 are classified into plural groups, the following problems occur.

A first problem occurs, for example, in a case where a user transmits print instruction information to the image processing apparatus 50*c* in the office X and wants to perform printing based on the print instruction information in the office Y. In such a case, the user cannot tell which of the image processing apparatuses 50 in the office Y is in a sharing relationship with the image processing apparatus 50*c* and whether or not expected print settings work.

A second problem occurs, for example, in a case where a user who is in the office X wants to perform printing by the image processing apparatus 50*d* after moving to the office Y. In such a case, the user wants to transmit print instruction information beforehand but cannot tell which of the image processing apparatuses 50 in the office X is in a sharing relationship with the image processing apparatus 50*d*.

In view of this, in the present exemplary embodiment, the mobile terminal 10 collects, from the plural image processing apparatuses 50, group information and feature information of each of the image processing apparatuses 50 and accumulates the collected group information and feature information in an image processing apparatus 50 connected to the mobile terminal 10. That is, the group information and the feature information of the image processing apparatuses 50 are shared among the image processing apparatuses 50 when the mobile terminal 10 is connected.

FIGS. 5A to 7C illustrate an example of such sharing of group information and feature information. In FIGS. 5A to 7C, "GROUP: a" and "GROUP: B" are examples of the group information. Furthermore, "FULL-COLOR APPARATUS" and "MONOCHROMATIC APPARATUS" and "A3 APPARATUS" and "A4 APPARATUS" are examples of the model information, and "REMAINING TONER AMOUNT" is an example of state information. Furthermore, the location information may be information on latitude and longitude obtained by a global positioning system (GPS).

Figure 5A:
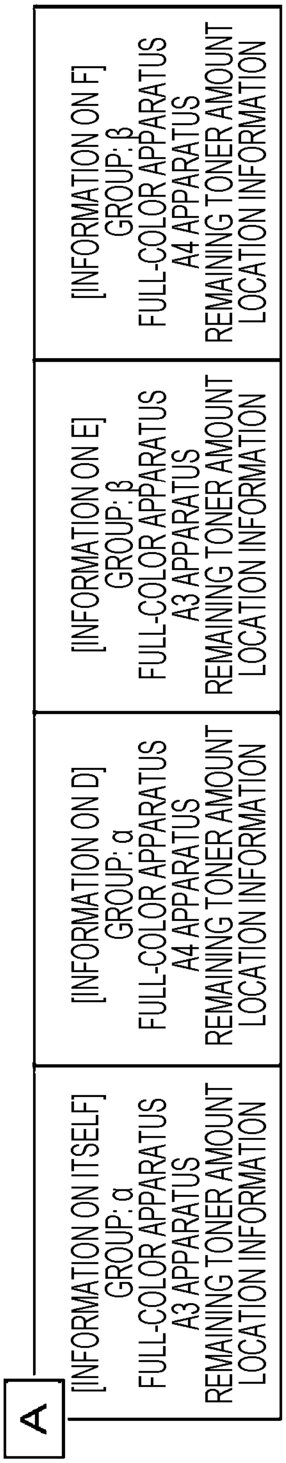
FIGS. 5A to 5C illustrate an example of information held by image processing apparatuses and the mobile terminal in an initial state.
Figure 5B:
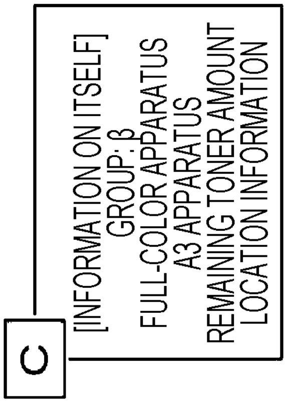
Figure 5C:
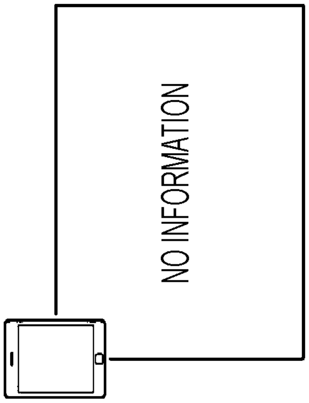

FIGS. 5A to 5C illustrate an example of information held by the image processing apparatus 50*a*, the image processing apparatus 50*c*, and the mobile terminal 10 in an initial state.

As illustrated in FIG. 5A, it is assumed that the image processing apparatus 50*a* holds information on itself and information on the image processing apparatuses 50*d*, 50*e*, and 50*f* in the initial state. Note that although the image processing apparatus 50*a* is supposed to hold only information on itself in a complete initial state, it is assumed here for convenience of description that information on other image processing apparatuses 50 has been accumulated in advance via a mobile terminal 10 different from the mobile terminal 10 illustrated in FIG. 5C.

As illustrated in FIG. 5B, it is assumed that the image processing apparatus 50*c* holds only information on itself in the initial state.

As illustrated in FIG. 5C, it is assumed that the mobile terminal 10 holds no information on the image processing apparatuses 50 in the initial state.

In such a state, the mobile terminal 10 acquires information on the image processing apparatuses 50. At this time, the mobile terminal 10 accumulates information on itself in the image processing apparatuses 50. That is, in the present exemplary embodiment, the mobile terminal 10 transmits information while using an image processing apparatus 50 as a hub.

Specifically, first, the mobile terminal 10 acquires group information and feature information of the image processing apparatuses 50 by connecting to an image processing apparatus 50. The feature information is, for example, model information such as a printable size and color information and location information.

It is assumed here that the mobile terminal 10 connects to the image processing apparatus 50*a*. As a result, the mobile terminal 10 acquires the information held by the image processing apparatus 50*a*.

Figure 6A:
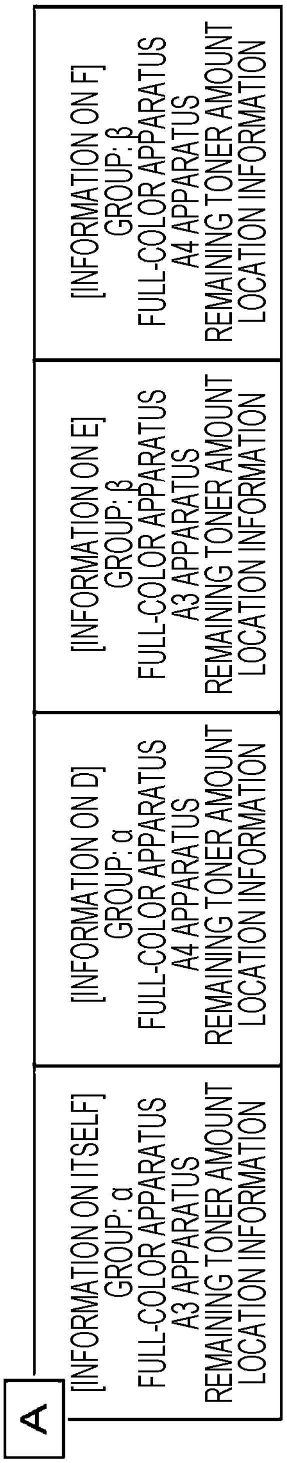
FIGS. 6A to 6C illustrate an example of information held by the image processing apparatuses and the mobile terminal in a case where the mobile terminal is connected to a certain image processing apparatus.
Figure 6B:
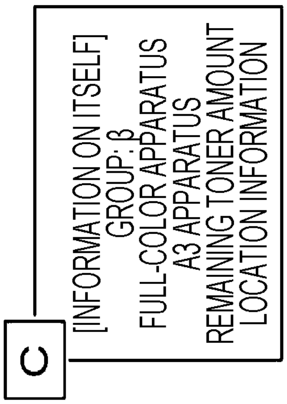
Figure 6C:

FIGS. 6A to 6C illustrate an example of information held by the image processing apparatus 50*a*, the image processing apparatus 50*c*, and the mobile terminal 10 in this state.

As illustrated in FIG. 6A, in this state, the image processing apparatus 50*a* holds the information on itself and the information on the image processing apparatuses 50*d*, 50*e*, and 50*f* as in the initial state.

As illustrated in FIG. 6B, in this state, the image processing apparatus 50*c* holds information on itself as in the initial state.

As illustrated in FIG. 6C, in this state, the mobile terminal 10 holds the information on the image processing apparatuses 50*a*, 50*d*, 50*e*, and 50*f* accumulated in the image processing apparatus 50*a*.

Next, the mobile terminal 10 transmits the information held by the mobile terminal 10 to an image processing apparatus 50 by connecting to the image processing apparatus 50.

It is assumed here that the mobile terminal 10 connects to the image processing apparatus 50*c*. As a result, information is synchronized between the mobile terminal 10 and the image processing apparatus 50*c*.

Figure 7A:
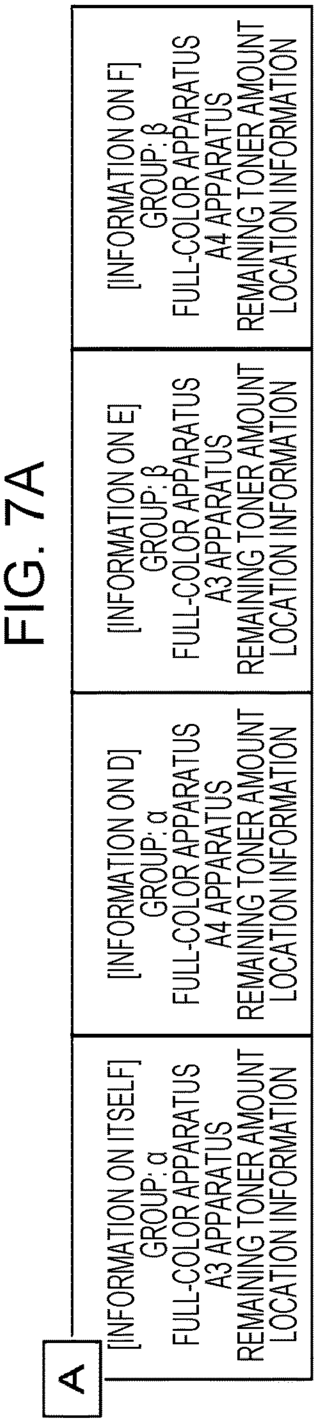
FIGS. 7A to 7C illustrate an example of information held by the image processing apparatuses and the mobile terminal in a case where the mobile terminal is connected to another image processing apparatus.
Figure 7B:
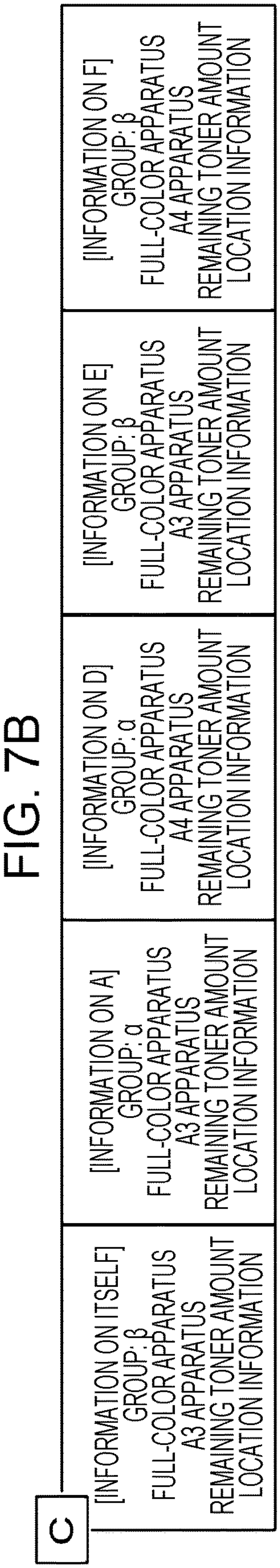
Figure 7C:
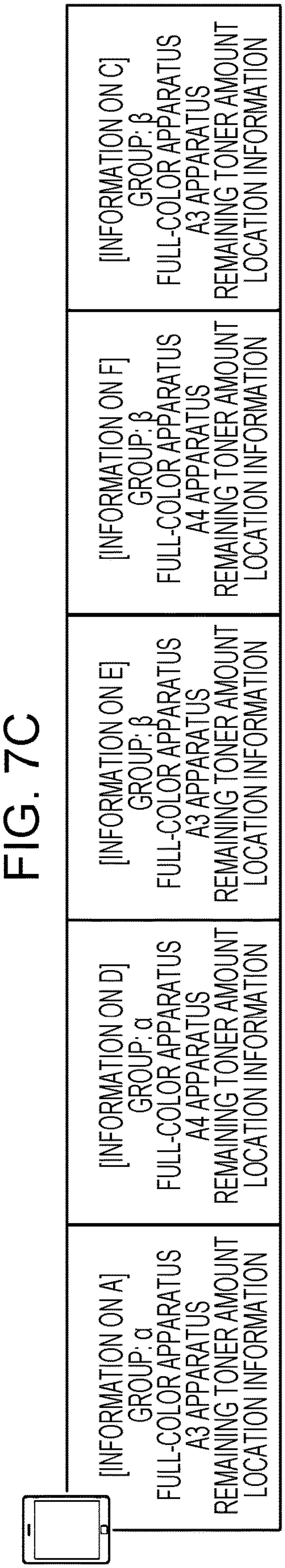

FIGS. 7A to 7C illustrate an example of information held by the image processing apparatus 50*a*, the image processing apparatus 50*c*, and the mobile terminal 10 in this state.

As illustrated in FIG. 7A, in this state, the image processing apparatus 50*a* holds the information on itself and the information on the image processing apparatuses 50*d*, 50*c*, and 50*f* as in the state of FIG. 6A.

As illustrated in FIG. 7B, in this state, the image processing apparatus 50*c* holds the information on the image processing apparatuses 50*a*, 50*d*, 50*e*, and 50*f* held by the mobile terminal 10 in addition to the information on itself held in FIG. 6B.

As illustrated in FIG. 7C, in this state, the mobile terminal 10 holds the information on the image processing apparatus 50*c* in addition to the information on the image processing apparatuses 50*a*, 50*d*, 50*c*, and 50*f* held in FIG. 6C.

Then, to address the first problem, the mobile terminal 10 specifies an image processing apparatus 50 classified into the same group as the image processing apparatus 50*c* to which print instruction information has been transmitted.

Figure 8B:
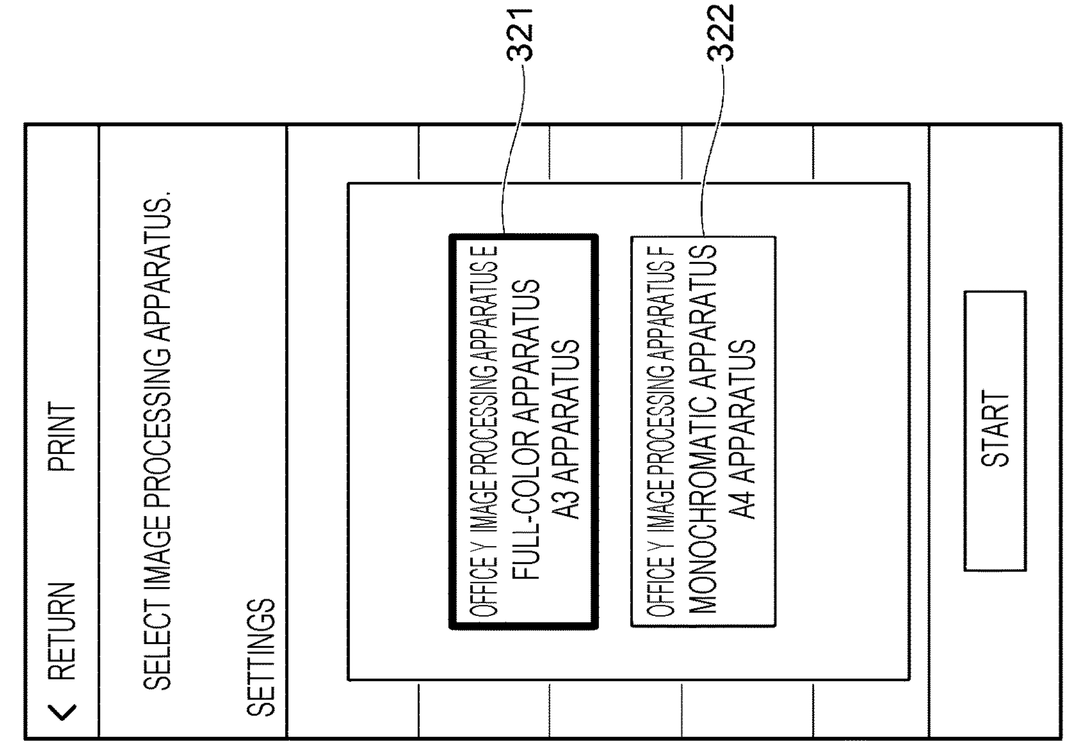
FIGS. 8A and 8B illustrate an example of a screen of the mobile terminal that displays an image processing apparatus classified into the same group as a transmission destination image processing apparatus to which print instruction information is transmitted.
Figure 8A:
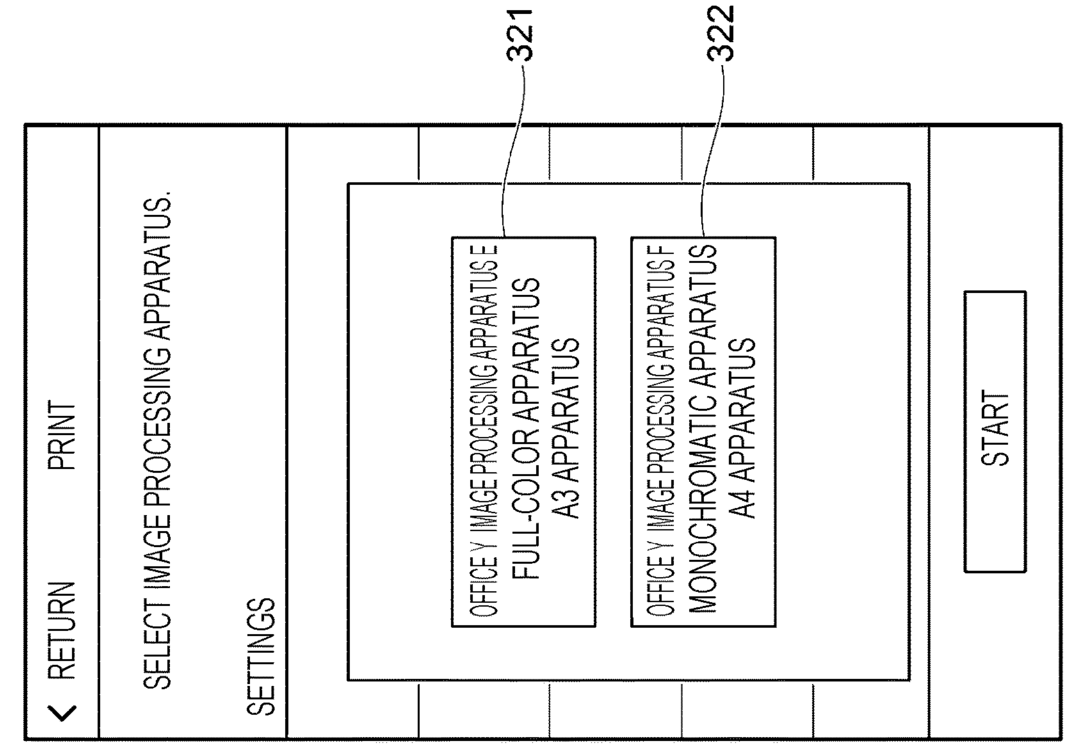

FIG. 8A illustrates an example of a screen 301 displayed on the mobile terminal 10. The screen 301 includes print destination display regions 321 and 322. The mobile terminal 10 specifies the image processing apparatuses 50*e* and 50*f* as image processing apparatuses 50 classified into the group β into which the image processing apparatus 50*c* has been classified on the basis of the information illustrated in FIG. 7C. Then, the mobile terminal 10 displays information on the image processing apparatuses 50*e* and 50*f* in the print destination display regions 321 and 322, respectively.

Then, the user determines which of the image processing apparatuses 50*e* and 50*f* displayed in the print destination display regions 321 and 322 satisfies print settings designated by the user. It is assumed here that the user has transmitted print instruction information designating full color and A3 as print settings to the image processing apparatus 50*c* and the image processing apparatus 50*e* satisfies the print settings.

FIG. 8B illustrates an example of a screen 302 displayed on the mobile terminal 10 at this time. As indicated by the thick-line frame in FIG. 8B, the user selects the print destination display region 321 in which the information on the image processing apparatus 50*c* is displayed.

In this case, the image processing apparatus 50*c* is an example of a first printer, and the image processing apparatuses 50*c* and 50*f* are examples of a second printer classified into the same group as the first printer.

Furthermore, the screens 301 and 302 are examples of a screen displayed in a case where print instruction information for giving a print instruction are sharable among printers classified into the same group, the first printer is a printer to which the print instruction information is transmitted, and the second printer is a print destination printer based on the print instruction information.

Furthermore, the screens 301 and 302 are examples of a screen on which the second printer is displayed in association with feature information of the second printer.

Although the image processing apparatuses 50 narrowed down on the basis of the group information are displayed on the screens 301 and 302, this is not restrictive.

The image processing apparatuses 50 may be displayed on the screens 301 and 302 without being narrowed down on the basis of the group information. That is, for example, on the screens 301 and 302, all of the image processing apparatuses 50 may be displayed and group information may be displayed in association with each of the image processing apparatuses 50.

Alternatively, the image processing apparatuses 50 narrowed down on the basis of the group information and the feature information may be displayed on the screens 301 and 302. As the feature information, for example, feature information designated by the print instruction information may be used. For example, the image processing apparatuses 50 may be narrowed down on the basis of the model information and only the image processing apparatus 50*c*, which is a full-color apparatus and an A3 apparatus, may be displayed on the screens 301 and 302. Alternatively, the image processing apparatuses 50 may be narrowed down on the basis of the state information and only an image processing apparatus 50 whose remaining toner amount is equal to or larger than a predetermined standard may be displayed on the screens 301 and 302. Alternatively, the image processing apparatuses 50 may be narrowed down on the basis of the location information and only an image processing apparatus 50 whose distance from the user is equal to or shorter than a predetermined standard may be displayed on the screens 301 and 302.

In this case, the displayed image processing apparatus 50 is an example of the second printer that is classified into the same group as the first printer and has a feature that matches a given feature.

In this case, the screens 301 and 302 are examples of a screen displayed in a case where print instruction information for giving a print instruction is sharable among printers classified into the same group, the first printer is a printer to which the print instruction information is transmitted, the second printer is a print destination printer based on the print instruction information, and the given feature is a feature designated by the print instruction information.

To address the second problem, the mobile terminal 10 specifies an image processing apparatus 50 classified into the same group as the image processing apparatus 50*d*, which is a print destination based on the print instruction information.

Figure 9B:
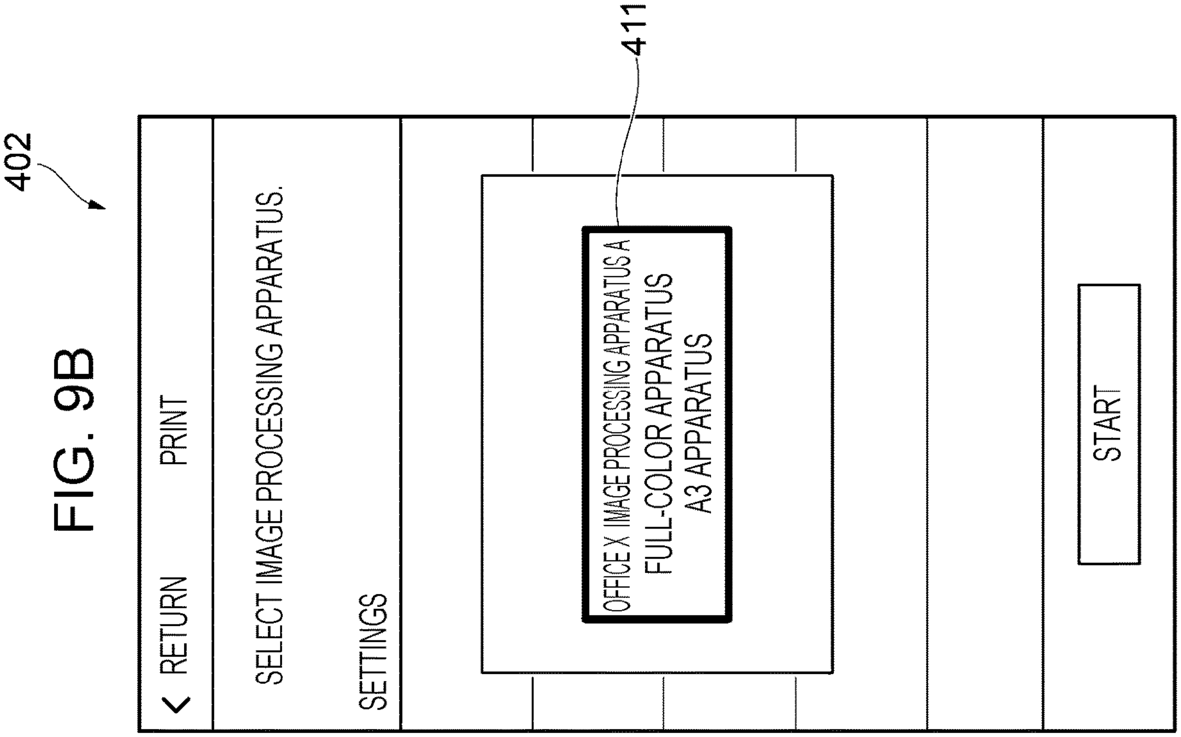
FIGS. 9A and 9B illustrate an example of a screen of the mobile terminal that displays an image processing apparatus classified into the same group as a print destination image processing apparatus based on print instruction information.
Figure 9A:
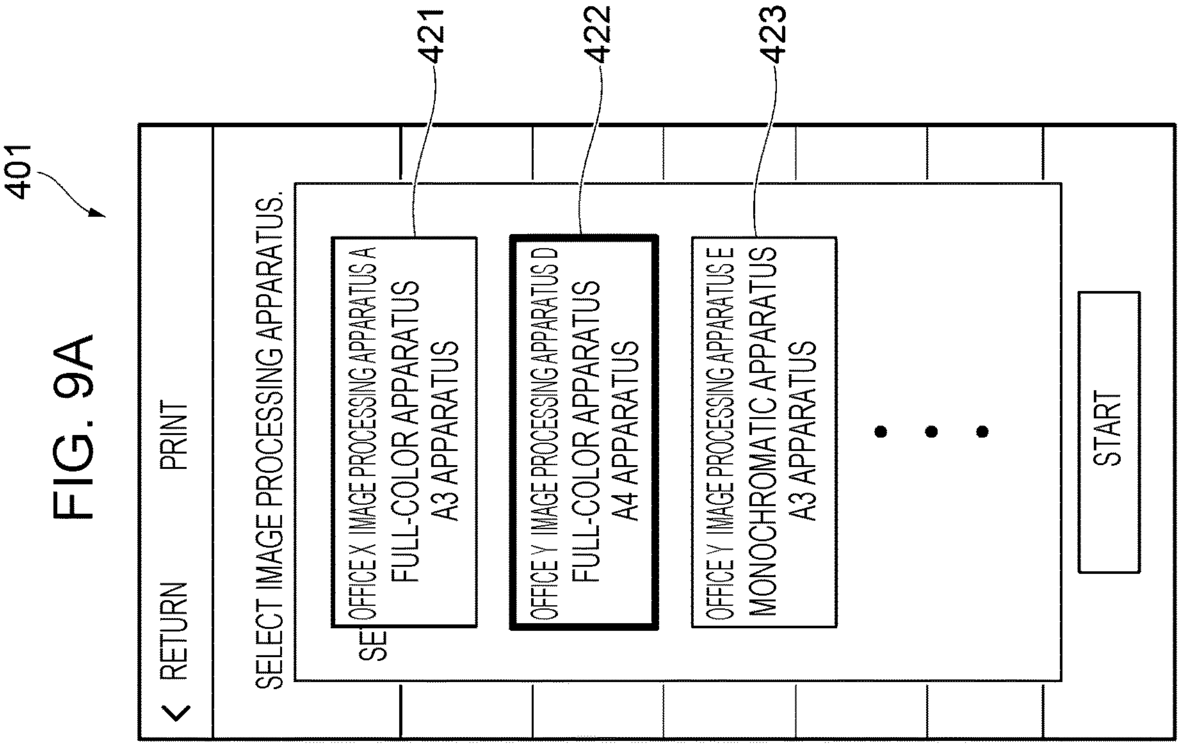

FIG. 9A illustrates an example of a screen 401 displayed on the mobile terminal 10 prior to this. The screen 401 includes print destination display regions 421, 422, 423, . . . . The mobile terminal 10 displays information on the image processing apparatuses 50 in the print destination display regions 421, 422, 423, . . . on the basis of the information illustrated in FIG. 7C. The user selects a print destination image processing apparatus 50 from the print destination display regions 421, 422, 423, . . . . It is assumed here that the user selects the print destination display region 422 in which the information on the image processing apparatus 50*d* is displayed, as indicated by the thick-line frame in FIG. 9A.

Since the print destination image processing apparatus 50*d* is outside the network, the mobile terminal 10 specifies an image processing apparatus 50 that is in a sharing relationship and to which print instruction information can be transmitted on the basis of the information held by the mobile terminal 10. That is, the mobile terminal 10 specifies the image processing apparatus 50*a* as an image processing apparatus 50 classified into the group a into which the image processing apparatus 50*d* is classified on the basis of the information illustrated in FIG. 7C. FIG. 9B illustrates an example of a screen 402 displayed on the mobile terminal 10 in this state. The screen 402 includes a transmission destination display region 411 in which a transmission destination to which the print instruction information is to be transmitted is displayed. As indicated by the thick-line frame in FIG. 9B, the user transmits the print instruction information to the image processing apparatus 50*a* in the office X by selecting the transmission destination display region 411 and performs printing by the image processing apparatus 50*d* in the office Y.

In this case, the image processing apparatus 50*d* is an example of the first printer, and the image processing apparatus 50*a* is an example of the second printer classified into the same group as the first printer.

Furthermore, the screen 402 is an example of a screen displayed in a case where print instruction information for giving a print instruction is sharable among printers classified into the same group, the first printer is a print destination printer based on the print instruction information, and the second printer is a transmission destination printer to which the print instruction information is to be transmitted.

Furthermore, the screen 402 is an example of a screen on which the second printer is displayed in association with feature information of the second printer.

Although the image processing apparatuses 50 narrowed down on the basis of the group information are displayed on the screen 402, this is not restrictive.

The image processing apparatuses 50 may be displayed on the screen 402 without being narrowed down on the basis of the group information. That is, for example, on the screen 402, all of the image processing apparatuses 50 may be displayed and group information may be displayed in association with each of the image processing apparatuses 50.

The image processing apparatuses 50 narrowed down on the basis of the group information and the feature information may be displayed on the screen 402. As the feature information, for example, feature information of the print destination image processing apparatus 50 based on the print instruction information may be used. For example, in a case where another image processing apparatus 50 is displayed, only the image processing apparatus 50*a*, which is a full-color apparatus, may be displayed on the screen 402 by narrowing down the image processing apparatuses 50 on the basis of the model information. Alternatively, in a case where another image processing apparatus 50 is displayed, only an image processing apparatus 50 whose toner remaining amount is equal to or larger than a predetermined standard may be displayed on the screen 402 by narrowing down the image processing apparatuses 50 on the basis of the state information. Alternatively, in a case where another image processing apparatus 50 is displayed, only an image processing apparatus 50 whose distance from the user is equal to or shorter than a predetermined standard may be displayed on the screen 402 by narrowing down the image processing apparatuses 50 on the basis of the location information.

In this case, the displayed image processing apparatus 50 is an example of a second printer that is classified into the same group as the first printer and has a feature that matches a given feature.

In this case, the screen 402 is an example of a screen displayed in a case where print instruction information for giving a print instruction is sharable among printers classified into the same group, the first printer is a print destination printer based on the print instruction information, the second printer is a transmission destination printer to which the print instruction information is to be transmitted, and the given feature is a feature of the first printer.

Functional Configuration of Mobile Terminal

Figure 10:
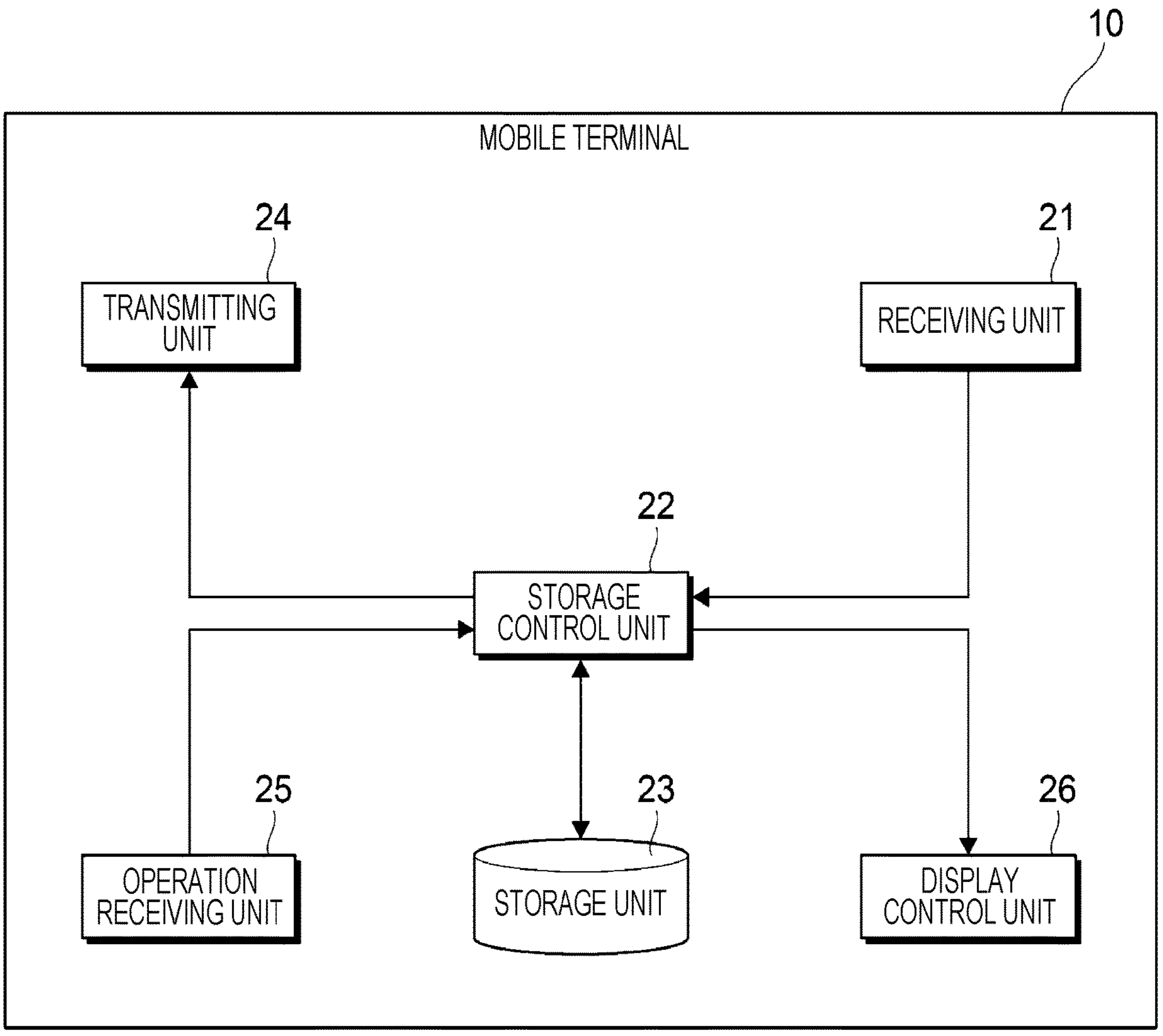
FIG. 10 is a block diagram illustrating an example of a functional configuration of the mobile terminal according to the present exemplary embodiment.

FIG. 10 is a block diagram illustrating an example of a functional configuration of the mobile terminal 10 that performs such schematic operation. As illustrated in FIG. 10, the mobile terminal 10 includes a receiving unit 21, a storage control unit 22, a storage unit 23, a transmitting unit 24, an operation receiving unit 25, and a display control unit 26.

The receiving unit 21 receives, from an image processing apparatus 50 connected to the mobile terminal 10, group information and feature information held by the image processing apparatus 50. At this time, the receiving unit 21 may receive group information and feature information of an image processing apparatus 50 to which the mobile terminal 10 has not been connected before via the image processing apparatus 50 to which the mobile terminal 10 is being currently connected.

In the present exemplary embodiment, the function of the receiving unit 21 is used as an example of a function of collecting group information of each of plural printers classified into plural groups from each of the plural printers by connecting to each of the plural printers. In the present exemplary embodiment, the function of the receiving unit 21 is also used as an example of a function of further collecting feature information of each of the plural printers from each of the plural printers by connecting to each of the plural printers.

Furthermore, in the present exemplary embodiment, the function of the receiving unit 21 is used as an example of a function of receiving group information of the plural printers from a specific printer by connecting to the specific printer. In the present exemplary embodiment, the function of the receiving unit 21 is also used as an example of a function of receiving group information and feature information of the plural printers from a specific printer by connecting to the specific printer.

Furthermore, in the present exemplary embodiment, the function of the receiving unit 21 is used as an example of a function of receiving group information of a printer to which the mobile terminal 10 has not been connected before among the plural printers from a specific printer.

In a case where the receiving unit 21 receives group information and feature information held by an image processing apparatus 50, the storage control unit 22 stores the group information and the feature information in the storage unit 23.

Furthermore, the storage control unit 22 reads out group information and feature information of image processing apparatuses 50 other than the image processing apparatus 50 to which the mobile terminal 10 is being currently connected among the group information and the feature information of the plural image processing apparatuses 50 stored in the storage unit 23 and delivers the group information and the feature information thus read out to the transmitting unit 24.

Furthermore, in a case where the operation receiving unit 25 receives an operation of designating an image processing apparatus 50, the storage control unit 22 specifies an image processing apparatus 50 classified into the same group as the designated image processing apparatus 50 by referring to the group information of the plural image processing apparatuses 50 stored in the storage unit 23. At this time, the storage control unit 22 may acquire feature information of the specified image processing apparatus 50 from the feature information of the plural image processing apparatuses 50 stored in the storage unit 23. The designated image processing apparatus 50 may be, for example, a transmission destination image processing apparatus 50 to which print instruction information is transmitted. Alternatively, the designated image processing apparatus 50 may be a print destination image processing apparatus 50 based on the print instruction information.

The storage unit 23 stores therein the group information and the feature information received by the receiving unit 21 under control of the storage control unit 22.

The transmitting unit 24 transmits, to the image processing apparatus 50 to which the mobile terminal 10 is being currently connected, group information and feature information of the other image processing apparatuses 50 read out from the storage unit 23 by the storage control unit 22.

In the present exemplary embodiment, the function of the transmitting unit 24 is provided as an example of a function of accumulating group information of each of plural printers in a specific printer among the plural printers as group information of the plural printers together with group information of the specific printer by connecting to the specific printer. In the present exemplary embodiment, the function of the transmitting unit 24 is used as an example of a function of further accumulating feature information of each of the plural printers in the specific printer as feature information of the plural printers together with feature information of the specific printer by connecting to the specific printer.

The operation receiving unit 25 receives an operation on the touch panel 14 of designating an image processing apparatus 50 from among the plural image processing apparatuses 50. Furthermore, in a case where image processing apparatuses 50 classified into the same group as the designated image processing apparatus 50 are displayed, the operation receiving unit 25 receives an operation on the touch panel 14 of selecting a print destination image processing apparatus 50 based on print instruction information from among the displayed image processing apparatuses 50. The designated image processing apparatus 50 may be, for example, a transmission destination image processing apparatus 50 to which the print instruction information is transmitted. Alternatively, the designated image processing apparatus 50 may be, for example, a print destination image processing apparatus 50 based on the print instruction information.

In a case where the operation receiving unit 25 receives an operation of designating an image processing apparatus 50, the display control unit 26 controls the touch panel 14 to display an image processing apparatus 50 specified by the storage control unit 22. At this time, the display control unit 26 may control the touch panel 14 to display feature information acquired by the storage control unit 22 together with an image processing apparatus 50 classified as the same group as the designated image processing apparatus 50. The designated image processing apparatus 50 may be, for example, a transmission destination image processing apparatus 50 to which the print instruction information is transmitted. In this case, the specified image processing apparatus 50 may be a print destination image processing apparatus 50 based on the print instruction information. Alternatively, the designated image processing apparatus 50 may be, for example, a print destination image processing apparatus 50 based on the print instruction information. In this case, the specified image processing apparatus 50 may be a transmission destination image processing apparatus 50 to which the print instruction information is transmitted.

In the present exemplary embodiment, the function of the display control unit 26 is used as an example of a function of performing control of displaying a second printer among the plural printers on the basis of group information of the plural printers when a first printer among the plural printers is designated. In the present exemplary embodiment, the function of the display control unit 26 is also used as an example of a function of performing control of displaying a second printer among the plural printers on the basis of group information and feature information of the plural printers when a first printer among the plural printers is designated.

Operation of Image Processing System

Figure 11:
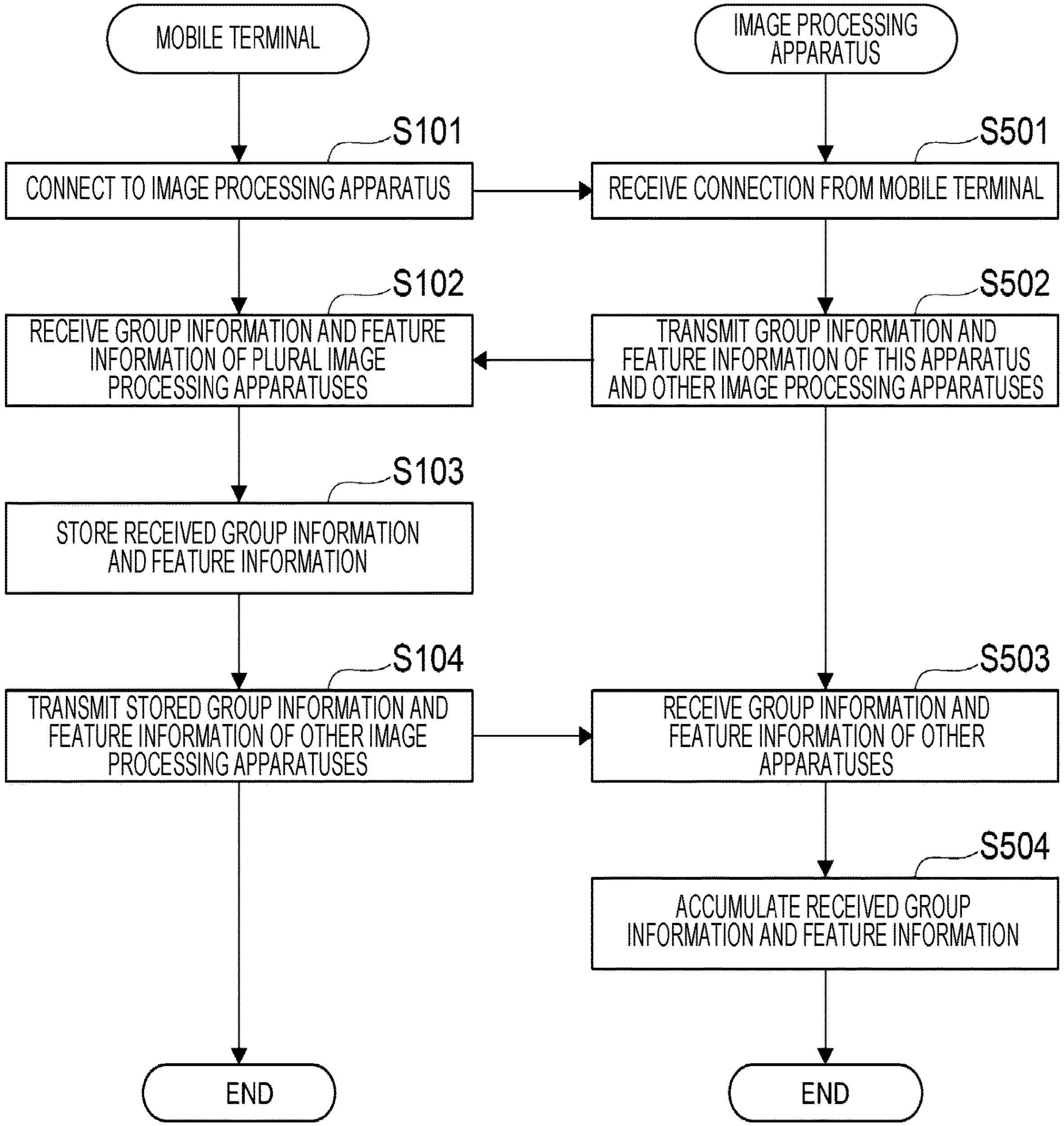
FIG. 11 is a sequence diagram illustrating an operation example of the image processing system according to the present exemplary embodiment.

FIG. 11 is a sequence diagram illustrating an operation example of the image processing system 1 in a case where group information and feature information are shared among the image processing apparatuses 50.

As illustrated in FIG. 11, first, the mobile terminal 10 connects to an image processing apparatus 50 by the Internet protocol (IP), Bonjour, near field communication (NFC), quick response (QR), or the like (step 101).

The image processing apparatus 50 receives the connection from the mobile terminal 10 (step 501). Then, the image processing apparatus 50 transmits group information and feature information thereof and group information and feature information of other image processing apparatuses 50 to the mobile terminal 10 (step 502). The group information is identification information of a group into which the image processing apparatus 50 is classified. The feature information is, for example, model information such as a color or a paper size, state information such as a remaining toner amount, or location information indicative of a location where the image processing apparatus 50 is installed.

The mobile terminal 10 receives the group information and the feature information of the plural image processing apparatuses 50 transmitted in step 502 from the image processing apparatus 50 (step 102). Specifically, the receiving unit 21 receives the group information and feature information from the image processing apparatus 50 to which the mobile terminal 10 is being currently connected.

Then, the mobile terminal 10 stores the group information and the feature information received in step 102 (step 103). Specifically, the storage control unit 22 stores the received group information and feature information in the storage unit 23.

Then, the mobile terminal 10 transmits group information and feature information of other image processing apparatuses 50 stored in the storage unit 23 to the image processing apparatus 50 (step 104). Specifically, the storage control unit 22 reads out group information and feature information of image processing apparatuses 50 other than the image processing apparatus 50 to which the mobile terminal 10 is being currently connected among the group information and feature information of the plural image processing apparatuses 50 stored in the storage unit 23. Then, the transmitting unit 24 transmits the group information and the feature information thus read out to the image processing apparatus 50 to which the mobile terminal 10 is being currently connected.

The image processing apparatus 50 receives the group information and the feature information of the other image processing apparatuses 50 transmitted in step 104 from the mobile terminal 10 (step 503). Then, the image processing apparatus 50 accumulates the group information and the feature information of the other image processing apparatuses 50 received in step 503 (step 504). The image processing apparatus 50 desirably accumulates only information that is not held by this image processing apparatus 50 or only information updated from information held by this image processing apparatus 50 among the group information and the feature information of the other image processing apparatuses 50 received in step 503.

A flow of sharing of the group information and feature information illustrated in FIGS. 5A to 7C is described with reference to the operation example of the operation of FIG.

11. First, assume that the image processing apparatus of FIG. 11 is the image processing apparatus 50*a*.

In this case, the image processing apparatus 50*a*, the image processing apparatus 50*c*, and the mobile terminal 10 hold the information illustrated in FIGS. 5A to 5C before start of the operation example of FIG. 11. Note that although the image processing apparatus 50*a* is supposed to hold only information on itself in a complete initial state, it is assumed here for convenience of description that information on other image processing apparatuses 50 is accumulated in advance via a mobile terminal 10 different from the mobile terminal 10 illustrated in FIG. 5C, as described above.

The image processing apparatus 50*a*, the image processing apparatus 50*c*, and the mobile terminal 10 hold the information illustrated in FIGS. 6A to 6C after end of the operation example of FIG. 11.

Next, assume that the image processing apparatus of FIG. 11 is the image processing apparatus 50*c*.

In this case, the image processing apparatus 50*a*, the image processing apparatus 50*c*, and the mobile terminal 10 hold the information illustrated in FIGS. 6A to 6C before start of the operation example of FIG. 11.

The image processing apparatus 50*a*, the image processing apparatus 50*c*, and the mobile terminal 10 hold the information illustrated in FIGS. 7A to 7C after end of the operation example of FIG. 11.

Figure 12:
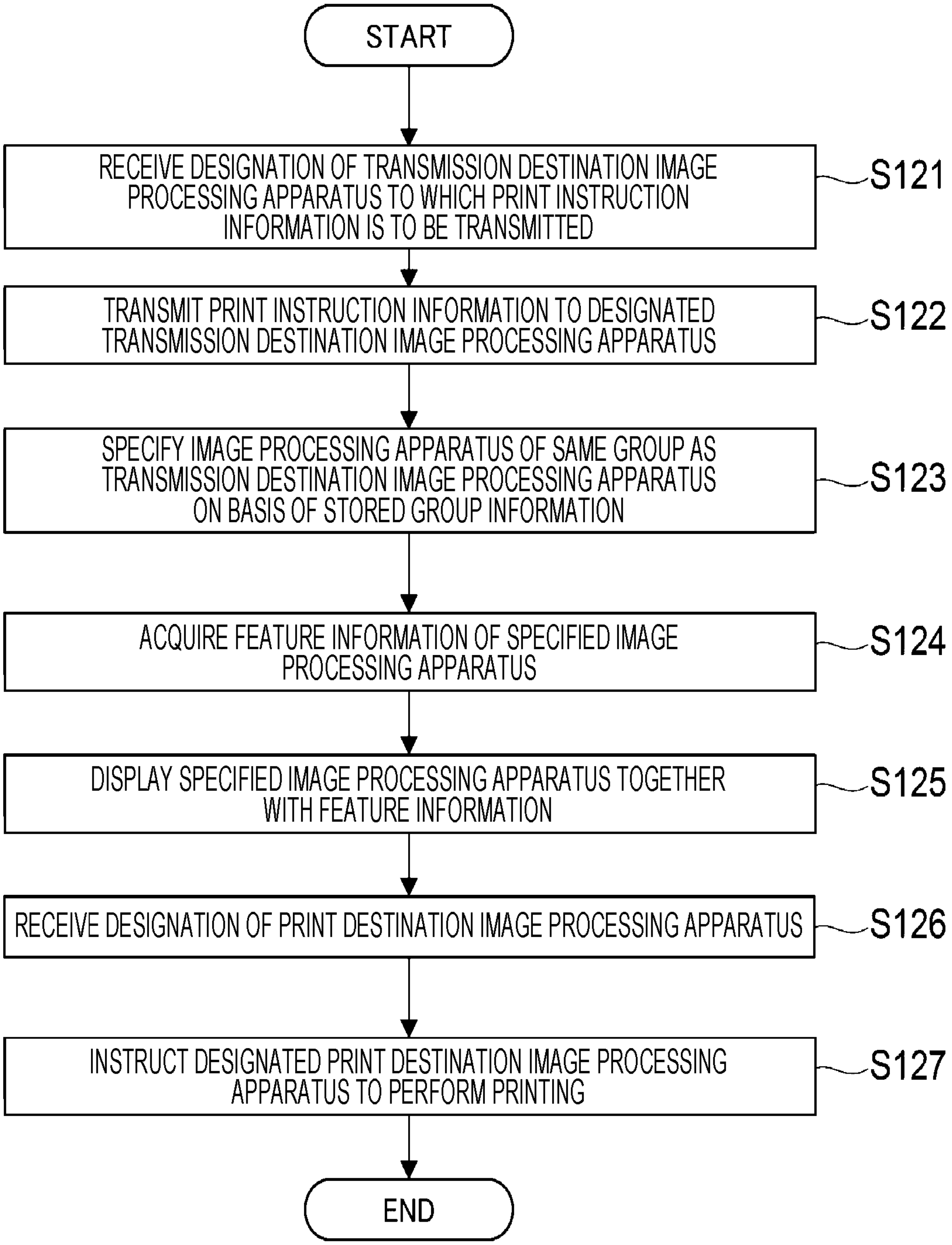
FIG. 12 is a flowchart illustrating an operation example of the mobile terminal according to the present exemplary embodiment.

FIG. 12 is a flowchart illustrating an operation example of the mobile terminal 10 in a case where an image processing apparatus 50 that can perform printing is displayed upon designation of a transmission destination image processing apparatus 50 to which print instruction information is to be transmitted.

As illustrated in FIG. 12, first, the mobile terminal 10 receives designation of a transmission destination image processing apparatus 50 to which print instruction information is to be transmitted (step 121). Specifically, the operation receiving unit 25 receives an operation of selecting an image processing apparatus 50 to which a user wants to transmit print instruction information from among plural image processing apparatuses 50 displayed on the touch panel 14.

The mobile terminal 10 transmits the print instruction information to the transmission destination image processing apparatus 50 designated in step 121 (step 122). Specifically, the transmitting unit 24 transmits the print instruction information to the image processing apparatus 50 selected by the operation received by the operation receiving unit 25.

Then, the mobile terminal 10 specifies an image processing apparatus 50 classified into the same group as the image processing apparatus 50 designated in step 121 on the basis of the group information stored in the storage unit 23 (step 123). Specifically, the storage control unit 22 searches for group information while using, as a key, identification information of the image processing apparatus 50 selected by the operation received by the operation receiving unit 25 and specifies an image processing apparatus 50 classified into a group indicated by the group information thus searched for.

Next, the mobile terminal 10 acquires feature information of the image processing apparatus 50 specified in step 123 (step 124). Specifically, the storage control unit 22 acquires feature information associated with the specified image processing apparatus 50 from among feature information stored in the storage unit 23.

Next, the mobile terminal 10 displays the image processing apparatus 50 specified in step 123 together with the feature information of the image processing apparatus 50 acquired in step 124 (step 125). Specifically, the display control unit 26 performs control of displaying identification information of the image processing apparatus 50 on the touch panel 14 together with the feature information of the image processing apparatus 50.

Then, the mobile terminal 10 receives designation of a print destination image processing apparatus 50 based on the print instruction information (step 126). Specifically, the operation receiving unit 25 receives an operation of selecting an image processing apparatus 50 by which the user wants to perform printing based on the print instruction information from among the plural image processing apparatuses 50 displayed on the touch panel 14.

Then, finally, the mobile terminal 10 instructs the print destination image processing apparatus 50 designated in step 126 to perform printing (step 127). Specifically, the transmitting unit 24 acquires the print instruction information from the transmission destination image processing apparatus 50 and transmits an instruction to perform printing based on the print instruction information to the image processing apparatus 50 selected by the operation received by the operation receiving unit 25.

Figure 13:
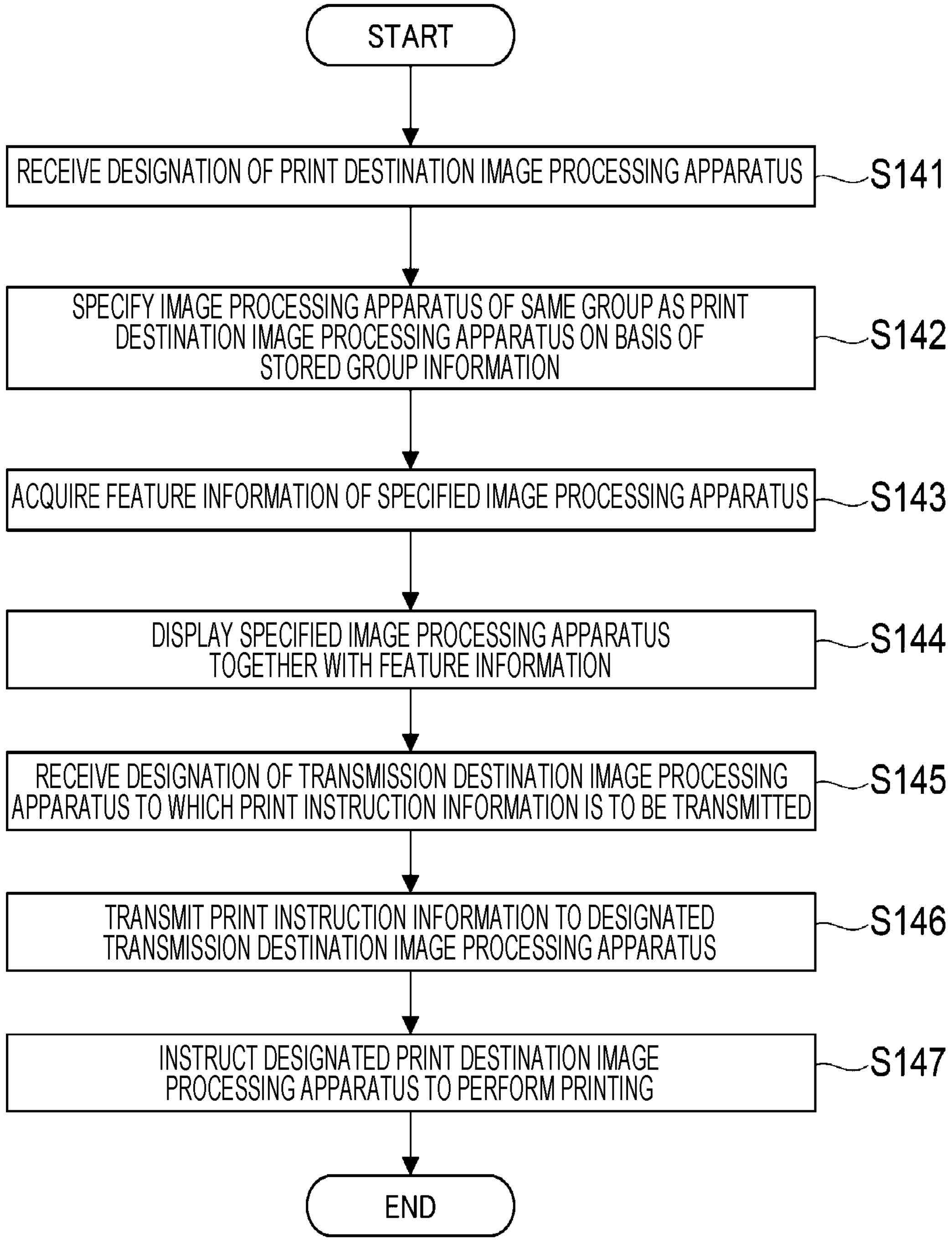
FIG. 13 is a flowchart illustrating an operation example of the mobile terminal according to the present exemplary embodiment.

FIG. 13 is a flowchart illustrating an operation example of the mobile terminal 10 in a case where an image processing apparatus 50 to which print instruction information can be transmitted is displayed in accordance with designation of a print destination image processing apparatus 50.

As illustrated in FIG. 13, first, the mobile terminal 10 receives designation of a print destination image processing apparatus 50 (step 141). Specifically, the operation receiving unit 25 receives an operation of selecting an image processing apparatus 50 by which a user wants to perform printing from among plural image processing apparatuses 50 displayed on the touch panel 14.

Then, the mobile terminal 10 specifies an image processing apparatus 50 classified into the same group as the image processing apparatus 50 designated in step 141 on the basis of group information stored in the storage unit 23 (step 142). Specifically, the storage control unit 22 searches for group information while using, as a key, identification information of the image processing apparatus 50 selected by the operation received by the operation receiving unit 25 and specifies an image processing apparatus 50 classified into a group indicated by the group information thus searched for.

Next, the mobile terminal 10 acquires feature information of the image processing apparatus 50 specified in step 142 (step 143). Specifically, the storage control unit 22 acquires feature information associated with the specified image processing apparatus 50 from among feature information stored in the storage unit 23.

Next, the mobile terminal 10 displays the image processing apparatus 50 specified in step 142 together with the feature information of the image processing apparatus 50 acquired in step 143 (step 144). Specifically, the display control unit 26 performs control of displaying identification information of the image processing apparatus 50 on the touch panel 14 together with the feature information of the image processing apparatus 50.

Then, the mobile terminal 10 receives designation of a transmission destination image processing apparatus 50 to which print instruction information is to be transmitted (step 145). Specifically, the operation receiving unit 25 receives an operation of selecting an image processing apparatus 50 to which the user wants to transmit the print instruction information from among the plural image processing apparatuses 50 displayed on the touch panel 14.

Then, finally, the mobile terminal 10 transmits the print instruction information to the transmission destination image processing apparatus 50 designated in step 145 (step 146). Specifically, the transmitting unit 24 transmits the print instruction information to the image processing apparatus 50 selected by the operation received by the operation receiving unit 25.

Furthermore, the mobile terminal 10 instructs the print destination image processing apparatus 50 designated in step 141 to perform printing (step 147). Specifically, the transmitting unit 24 acquires the print instruction information from the transmission destination image processing apparatus 50 and transmits an instruction to perform printing based on the print instruction information to the image processing apparatus 50 selected by the operation received by the operation receiving unit 25.

Modifications

Although the mobile terminal 10 collects information from the image processing apparatuses 50 and accumulates the collected information in the image processing apparatuses 50 in the above description, this is not restrictive. For example, a collecting and accumulating apparatus (not illustrated) may collect information from the image processing apparatuses 50 and accumulate the collected information in the image processing apparatuses 50.

The collecting and accumulating apparatus may be a computer in which a dedicated program has been installed. In this case, the collecting and accumulating apparatus has a hardware configuration similar to the hardware configuration illustrated in FIG. 2. For example, the collecting and accumulating apparatus need just include at least a processor, a RAM, and a ROM and may additionally include a hard disk drive (HDD).

Furthermore, one of the plural image processing apparatuses 50 may serve as the collecting and accumulating apparatus. In this case, the collecting and accumulating apparatus has the hardware configuration illustrated in FIG. 3.

In the present exemplary embodiment, the collecting and accumulating apparatus is provided as an example of a management apparatus that manages plural printers or as an example of a management system.

Processor

In the present exemplary embodiment, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the present exemplary embodiment, the term "processor" is broad enough to encompass one processor or plural processors in collaboration which are located physically apart from each other but may work cooperatively. The order of operations of the processor is not limited to one described in the embodiments above, and may be changed.

Program

Processing performed by the mobile terminal 10 according to the present exemplary embodiment is, for example, prepared as a program such as application software.

In this case, a program that realizes the present exemplary embodiment can be grasped as a program causing a computer to realize a function of collecting group information of each of plural printers classified into plural groups from each of the plural printers by connecting to each of the plural printers and a function of accumulating group information of each of the plural printers in a specific printer among the plural printers as group information of the plural printers together with group information of the specific printer by connecting to the specific printer.

Note that the program that realizes the present exemplary embodiment can not only be offered by means of communication, but also can be offered by being stored in a recording medium such as a CD-ROM.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A program causing a computer to execute a process, the process including:

collecting group information of each of plural printers classified into plural groups from each of the plural printers by connecting to each of the plural printers; and accumulating group information of each of the plural printers in a specific printer among the plural printers as group information of the plural printers together with group information of the specific printer by connecting to the specific printer.

(((2)))

The program according to (((1))), in which:

the process further includes:

receiving the group information of the plural printers from the specific printer by connecting to the specific printer; and performing control of displaying a second printer among the plural printers on the basis of the group information of the plural printers when a first printer among the plural printers is designated.

(((3)))

The program according to (((2))), in which:

the second printer is a printer classified into a same group as the first printer.

(((4

The program according to (((3))), in which:

print instruction information for giving a print instruction is sharable among printers classified into a same group;

the first printer is a transmission destination printer to which the print instruction information is transmitted; and the second printer is a print destination printer based on the print instruction information.

(((5)))

The program according to (((3))), in which:

print instruction information for giving a print instruction is sharable among printers classified into a same group;

the first printer is a print destination printer based on the print instruction information; and the second printer is a transmission destination printer to which the print instruction information is transmitted.

(((6)))

The program according to any one of (((2))) to (((5))), in which:

the receiving includes receiving, from the specific printer, group information of a printer that has not been connected before among the plural printers.

(((7)))

The program according to (((1))), in which:

the collecting includes further collecting feature information of each of the plural printers from each of the plural printers by connecting to each of the plural printers; and the accumulating includes further accumulating feature information of each of the plural printers in the specific printer as feature information of the plural printers together with feature information of the specific printer by connecting to the specific printer.

(((8)))

The program according to (((7))), in which:

the process further includes:

receiving the group information and the feature information of the plural printers from the specific printer by connecting to the specific printer; and performing control of displaying a second printer among the plural printers on the basis of the group information and the feature information of the plural printers when a first printer among the plural printers is designated.

(((9)))

The program according to (((8))), in which:

the second printer is a printer classified as a same group as the first printer; and the performing control includes performing control of displaying the second printer in association with feature information of the second printer.

(((10)))

The program according to (((8))), in which:

the second printer is a printer that is classified as a same group as the first printer and has a feature that matches a given feature.

(((11)))

The program according to (((10))), in which:

print instruction information for giving a print instruction is sharable among printers classified into a same group;

the first printer is a transmission destination printer to which the print instruction information is transmitted;

the second printer is a print destination printer based on the print instruction information; and the given feature is a feature designated by the print instruction information.

(((12)))

The program according to (((10))), in which:

print instruction information for giving a print instruction is sharable among printers classified into a same group;

the first printer is a print destination printer based on the print instruction information;

the second printer is a transmission destination printer to which the print instruction information is transmitted; and the given feature is a feature of the first printer.

(((13)))

A management system including one or more processors, wherein the one or more processors collect group information of each of plural printers classified into plural groups from each of the plural printers by connecting to each of the plural printers and accumulate group information of each of the plural printers in a specific printer among the plural printers as group information of the plural printers together with group information of the specific printer by connecting to the specific printer.

(((14)))

A printing system including:

plural printers classified into plural groups; and a management apparatus that manages the plural printers, in which:

the management apparatus includes one or more processors, and the one or more processors collect group information of each of the plural printers from each of the plural printers by connecting to each of the plural printers and accumulate group information of each of the plural printers in a specific printer among the plural printers as group information of the plural printers together with group information of the specific printer by connecting to the specific printer.

What is claimed is:

1. A non-transitory computer readable medium storing a program causing a computer to execute a process, the process comprising:

collecting group information of each of a plurality of printers classified into a plurality of groups from each of the plurality of printers by connecting to each of the plurality of printers;

accumulating the collected group information of each of the plurality of printers in a specific printer among the plurality of printers as the group information of the plurality of printers together with the group information of the specific printer by connecting to the specific printer;

receiving the group information of the plurality of printers from the specific printer by connecting to the specific printer; and performing control of displaying a second printer among the plurality of printers on a basis of the group information of the plurality of printers when a first printer among the plurality of printers is designated.

2. The non-transitory computer readable medium according to claim 1, wherein:

the second printer is a printer classified into a same group as the first printer.

3. The non-transitory computer readable medium according to claim 2, wherein:

print instruction information for giving a print instruction is sharable among printers classified into a same group;

the first printer is a transmission destination printer to which the print instruction information is transmitted; and the second printer is a print destination printer based on the print instruction information.

4. The non-transitory computer readable medium according to claim 2, wherein:

print instruction information for giving a print instruction is sharable among printers classified into a same group;

the first printer is a print destination printer based on the print instruction information; and the second printer is a transmission destination printer to which the print instruction information is transmitted.

5. The non-transitory computer readable medium according to claim 1, wherein:

the receiving includes receiving, from the specific printer, the group information of a printer that has not been connected before among the plurality of printers.

6. The non-transitory computer readable medium according to claim 1, wherein:

the collecting includes further collecting feature information of each of the plurality of printers from each of the plurality of printers by connecting to each of the plurality of printers; and the accumulating includes further accumulating the collected feature information of each of the plurality of printers in the specific printer as the feature information of the plurality of printers together with the feature information of the specific printer by connecting to the specific printer.

7. The non-transitory computer readable medium according to claim 6, wherein:

the second printer is a printer classified as a same group as the first printer; and the performing control includes performing control of displaying the second printer in association with feature information of the second printer.

8. The non-transitory computer readable medium according to claim 6, wherein:

the second printer is a printer that is classified as a same group as the first printer and has a feature that matches a given feature.

9. The non-transitory computer readable medium according to claim 8, wherein:

print instruction information for giving a print instruction is sharable among printers classified into a same group;

the first printer is a transmission destination printer to which the print instruction information is transmitted;

the second printer is a print destination printer based on the print instruction information; and the given feature is a feature designated by the print instruction information.

10. The non-transitory computer readable medium according to claim 8, wherein:

print instruction information for giving a print instruction is sharable among printers classified into a same group;

the first printer is a print destination printer based on the print instruction information;

the second printer is a transmission destination printer to which the print instruction information is transmitted; and the given feature is a feature of the first printer.

11. A management system comprising one or more processors, wherein the one or more processors:

collect group information of each of a plurality of printers classified into a plurality of groups from each of the plurality of printers by connecting to each of the plurality of printers;

accumulate the collected group information of each of the plurality of printers in a specific printer among the plurality of printers as the group information of the plurality of printers together with the group information of the specific printer by connecting to the specific printer;

receive the group information of the plurality of printers from the specific printer by connecting to the specific printer; and perform control of displaying a second printer among the plurality of printers on a basis of the group information of the plurality of printers when a first printer among the plurality of printers is designated.

12. A printing system comprising:

a plurality of printers classified into a plurality of groups; and a management apparatus that manages the plurality of printers, wherein:

the management apparatus includes one or more processors; and the one or more processors:

collect group information of each of the plurality of printers from each of the plurality of printers by connecting to each of the plurality of printers;

accumulate the collected group information of each of the plurality of printers in a specific printer among the plurality of printers as the group information of the plurality of printers together with the group information of the specific printer by connecting to the specific printer;

receive the group information of the plurality of printers from the specific printer by connecting to the specific printer; and perform control of displaying a second printer among the plurality of printers on a basis of the group information of the plurality of printers when a first printer among the plurality of printers is designated.

* * * * *